United States Patent
Yoon

(10) Patent No.: US 8,827,372 B2
(45) Date of Patent: Sep. 9, 2014

(54) BLOWING SYSTEM

(75) Inventor: Chooseok Yoon, Seoul (KR)

(73) Assignee: Frontis Corp., Gyeonggi-do (KR)

( * ) Notice: Subject to any disclaimer, the term of this patent is extended or adjusted under 35 U.S.C. 154(b) by 253 days.

(21) Appl. No.: 13/174,909

(22) Filed: Jul. 1, 2011

(65) Prior Publication Data

US 2012/0006424 A1    Jan. 12, 2012

(30) Foreign Application Priority Data

Jul. 7, 2010  (KR) .................. 10-2010-0065165
Jan. 27, 2011  (KR) .................. 10-2011-0008091
Jan. 27, 2011  (KR) .................. 10-2011-0008092

(51) Int. Cl.
*A47C 7/02*    (2006.01)
*A47C 7/72*    (2006.01)

(52) U.S. Cl.
USPC ........... 297/452.42; 297/452.46; 297/180.13; 297/180.1

(58) Field of Classification Search
USPC ............... 297/452.42, 452.43, 452.46, 180.1, 297/180.13, 180.14
See application file for complete search history.

(56) References Cited

U.S. PATENT DOCUMENTS

| | | | | |
|---|---|---|---|---|
| 4,071,963 A * | 2/1978 | Fukuoka | ......... | 36/3 B |
| 6,079,781 A * | 6/2000 | Tilley | ......... | 297/250.1 |
| 6,105,667 A * | 8/2000 | Yoshinori et al. | ......... | 165/202 |
| 6,263,530 B1 * | 7/2001 | Feher | ......... | 5/423 |
| 6,929,322 B2 * | 8/2005 | Aoki et al. | ......... | 297/180.14 |
| 7,108,319 B2 * | 9/2006 | Hartwich et al. | ......... | 297/180.1 |
| 7,966,835 B2 * | 6/2011 | Petrovski | ......... | 62/3.3 |
| 8,181,290 B2 * | 5/2012 | Brykalski et al. | ......... | 5/423 |
| 2011/0048033 A1 * | 3/2011 | Comiskey et al. | ......... | 62/3.3 |

FOREIGN PATENT DOCUMENTS

JP   2007-054385    3/2007
JP   2007-215695    8/2007

* cited by examiner

*Primary Examiner* — Sarah B McPartlin
(74) *Attorney, Agent, or Firm* — Occhiuti & Rohlicek LLP

(57) ABSTRACT

A blowing pad, a fabrication method of the blowing pad, and a blowing system using the blowing pad are provided. The blowing pad includes a main foam formed of a foamed porous synthetic resin, and a duct embedded in the main foam, wherein the main foam includes an air inlet to which an air inlet tube is inserted and a plurality of vent holes, each of which is connected to the duct, wherein the duct is formed of any one of natural rubber, synthetic rubber, and non-porous plastic, wherein the air inlet tube is connected to an external blowing pipe.

7 Claims, 23 Drawing Sheets

BLOWING SYSTEM

RELATED APPLICATIONS

Under 35 USC 119, this application claims the benefit of the Jul. 7, 2010 priority date of Korean Patent Application No. 10-2010-0065165, and also the benefit of the Jan. 27, 2011 priority dates of Korean Patent Application No. 10-2011-0008091 and Korean Patent Application No. 10-2011-0008092. The entire contents of each of the foregoing applications is herein incorporated by reference for all purposes as if fully set forth herein.

TECHNICAL FIELD

The embodiments of this document are directed to a blowing pad, a fabricating method of the blowing pad, and a blowing system using the blowing pad.

BACKGROUND

There are seats or mats that provide various functions, such as air blowing or massaging.

Of such seats, a vehicular seat includes a frame, a head rest, a cushion pad, and a cover, and provides various functions, such as adjustment of angle of the head rest, or height or front-and-rear distance of the seat depending on a driver's physical conditions. There are cushion pads that have a function of blowing air including cool or warm air. Examples of such cushion pads are disclosed in Japanese Patent Application Publication Nos. 2007-054385 published on Mar. 8, 2007) and 2007-215695 published on Aug. 30, 2007.

FIGS. 1 and 2 are views illustrating a cooling/heating pad for a vehicular seat according to a related art.

Referring to FIGS. 1 and 2, each of cooling/heating pads 11 and 12 includes a main pad 13, a duct 14, and a foam cover 15.

The main pad 13, the duct 14, and the foam cover 15 are each formed of a porous synthetic resin, such as soft polyurethane foam. The duct 14 is processed to have a depressed structure with an opening at its upper portion. The main pad 13 includes a groove to which the main pad 13 is attached and a groove to which an air inlet tube 17 is attached. The foam cover 15 is attached to the main pad 13 to cover the opened upper portion of the duct 14. The foam cover 15 includes a plurality of vent holes 15a at the opened upper portion of the duct 14 to connect to the duct 14. The foam cover 15 is covered by an outer sheath (not shown). The outer sheath is formed of natural or synthetic fabric or leather having a plurality of vent holes. Cool or warm air is generated from the a vehicular air conditioner and supplied to the cooling or heating pad through the air inlet tube 17, and is then blown toward a user via the duct 14, the vent holes 15a, and external vent holes (not shown).

A method of fabricating a cooling/heating pad includes the processes of forming each of the main pad 13, the duct 14, and the foam cover 15 using a porous synthetic resin, treating the main pad 13 so that a portion of the main pad 13 is depressed and the main pad 13 has grooves to which the duct 14 and the air inlet tube 17 are attached, attaching the duct 14 and the air inlet tube 17 to the main pad 13, attaching the foam cover 15 to the main pad 13, and covering the outer sheath. Accordingly, the conventional fabrication method of the cooling/heating pad is disadvantageous in light of an increase in the number of processes and an increased process time due to the process of attaching the duct 14 between the main pad 13 and the foam cover 15, thus resulting in an increase of fabrication costs.

The duct 14 is formed of a porous synthetic resin with low durability and elasticity. Accordingly, when the conventional cooling/heating pad is used for a long time, the duct 14 may sink down due to a user's weight thus narrowing or clogging the flow path of the duct 14. For these reasons, the conventional cooling/heating pad suffers from a short lifespan and high costs.

Moreover, bacteria, mold, or mites harmful for a human body are prone to infiltrate into the main pad 13 through the duct 14 because the duct 14 is formed of the porous synthetic resin having low durability and elasticity, and long-term use of the conventional cooling/heating pad may cause contamination of the main pad 13 and resultantly unpleasant odors from the main pad 13.

SUMMARY

The embodiments of this document provide a blowing pad that may reduce the number of fabrication processes and the possibility of contamination and that may increase lifespan, a fabrication method of the blowing pad, and a blowing system using the blowing pad.

According to an embodiment disclosed by this document, there is provided a blowing pad comprising a main foam formed of a foamed porous synthetic resin, and a duct embedded in the main foam, wherein the main foam comprises an air inlet to which an air inlet tube is inserted and a plurality of vent holes, each of which is connected to the duct, wherein the duct is formed of any one of natural rubber, synthetic rubber, and non-porous plastic, wherein the air inlet tube is connected to an external blowing pipe.

According to an embodiment disclosed by this document, there is provided a method of fabricating a blowing pad comprising providing a duct in a mold and fixing the duct with a plurality of cores in the mold, wherein the duct is formed of any one of natural rubber, synthetic rubber, and non-porous plastic, supplying a porous synthetic resin in the mold and heating the porous synthetic resin to foam the porous synthetic resin in the mold, thereby forming a main foam with the duct in the main foam, wherein a temperature of foaming the porous synthetic resin is limited to be less than a heat distortion temperature, and separating the main foam from the mold, wherein the cushion pad comprises an air inlet to which an air inlet tube is inserted and a plurality of vent holes, each of which is connected to the duct, wherein the air inlet tube is connected to an external blowing pipe.

According to an embodiment disclosed by this document, there is provided a blowing system comprising a blowing apparatus, first and second blowing pads, an external blowing pipe that forms a first air flow path between the blowing apparatus and the first and second blowing pads, and an air processing unit that is detachably provided in the external blowing pipe, wherein each of the first and second blowing pads comprises a main foam formed of a foamed porous synthetic resin, and a duct embedded in the main foam, wherein the main foam comprises an air inlet to which an air inlet tube is inserted and a plurality of vent holes, each of which is connected to the duct, wherein the duct is formed of any one of natural rubber, synthetic rubber, and non-porous plastic, wherein the air inlet tube is connected to the external blowing pipe, wherein the air processing unit comprises one or more of a fragrant material, a deodorant material, a far infrared ray emission material, anion emission material, an air purification material, a dehumidifying material, an antibiotic material, and sterilization material, and wherein the air processing unit comprises a second air flow path that is connected to the first air flow path formed by the external blowing pipe.

BRIEF DESCRIPTION OF THE DRAWINGS

The accompanying drawings, which are included to provide a further understanding of the embodiments and are incorporated in and constitute a part of this specification, illustrate embodiments of the embodiments and together with the description serve to explain the principles of the embodiments. In the drawings.

DETAILED DESCRIPTION

Figure 1:
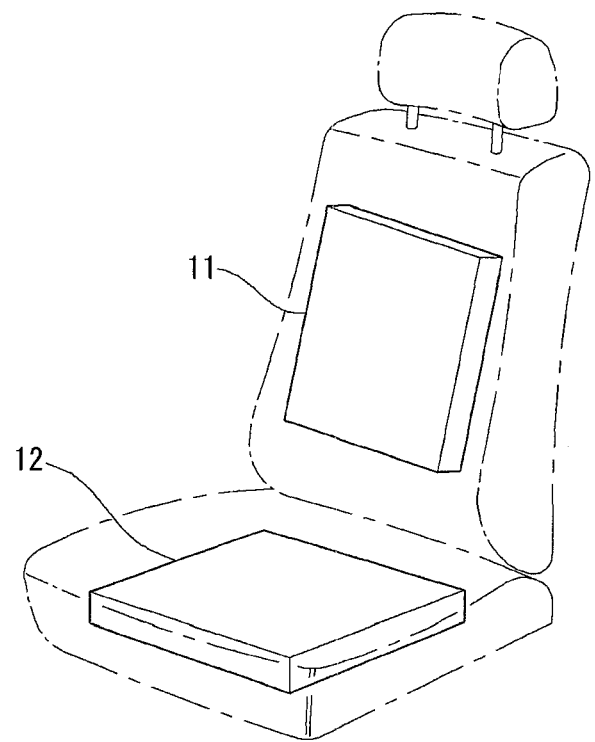
FIG. 1 is a perspective view schematically illustrating a cooling/heating blowing pad included in a vehicular seat according to a related art.
Figure 2:
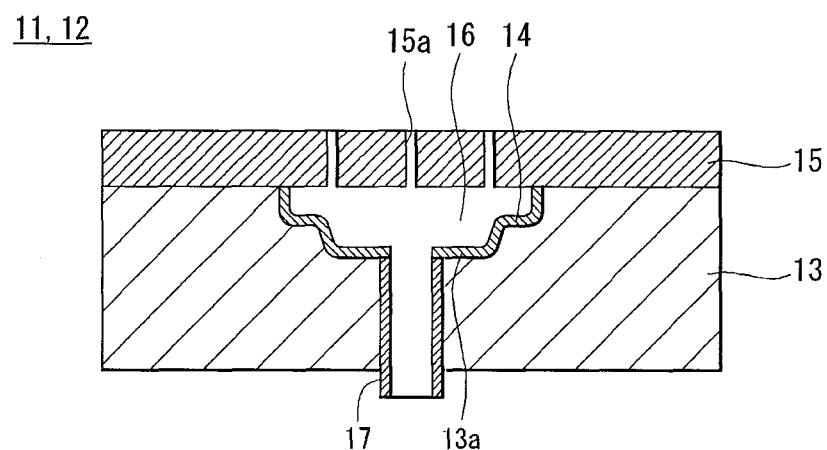
FIG. 2 is a cross-sectional view illustrating a cooling/heating blowing pad according to a related art.

Embodiments will now be described more fully hereinafter with reference to the accompanying drawings forming a part of this specification wherein like reference characters may be used to designate the same or substantially the same elements throughout the specification and the drawings. In the embodiments, detailed description of the publicly known functions and configurations that are judged to be able to make the gist of the embodiments unnecessarily obscure are omitted.

Figure 3:
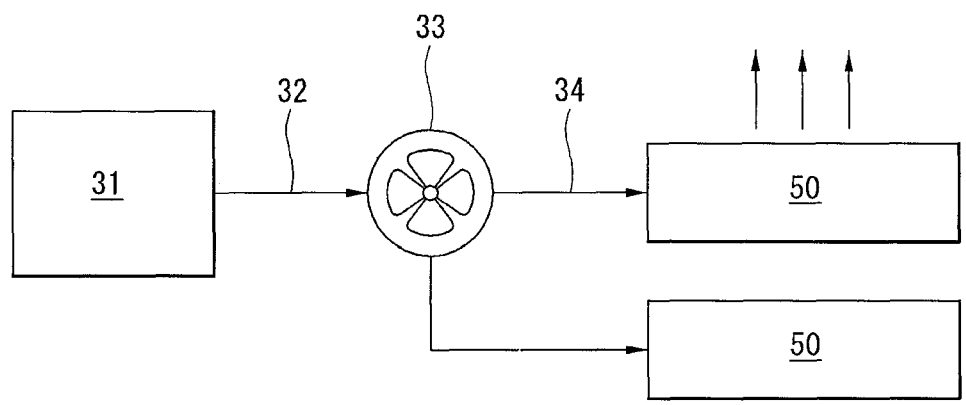
FIG. 3 is a block diagram illustrating a blowing system according to an embodiment disclosed by this document.

Referring to FIG. 3, a blowing system according to an embodiment includes a blowing apparatus 31, a blowing fan 33, and one or more blowing pads 50.

The blowing apparatus 31 is implemented as a general blower that blows air without cooling/heating functions. According to an embodiment, the blowing apparatus 31 includes an air conditioner that may cool or heat air depending on a user's selection. Air (or cool air or warm air) is supplied from the blowing apparatus 31 to the blowing pad 50 via a first external blowing pipe 32, the blowing fan 33, and a second external blowing pipe 34. The blowing pad 50 blows the supplied air (or cool air or warm air) to a user. The first and second blowing pipes 32 and 34 may include at least one or more of air processing units 130 and 230, an air storing unit 140, electronic valves 142 and 144, and thermoelectric elements 152 and 154 shown in FIGS. 18, 27, and 28.

The blowing pad 50 includes a main foam. The main foam is formed of porous polymer, such as urethane foam. A duct 52 is embedded in the main foam. The duct 52 has a split flow path structure so that air may be distributed through a plurality of portions of the blowing pad 50. The duct 52 is formed of an airtight, non-porous material that has a heat distortion temperature higher than a foaming temperature of the porous polymer and higher durability and elasticity than those of the porous polymer. For example, according to an embodiment, the material of the duct 52 includes natural rubber, synthetic rubber, or non-porous plastic. The plastics do not comprise porous polymer, such as urethane foam. As such, the blowing pad 50 and the duct 52 include different materials.

Figure 4:
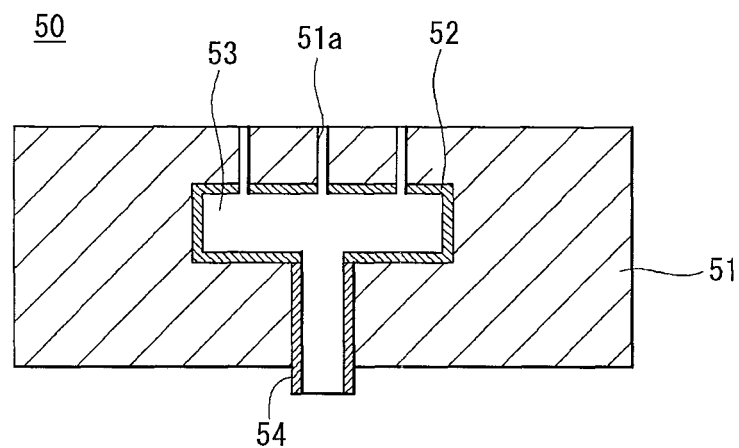
FIG. 4 is a cross-sectional view illustrating a blowing pad according to an embodiment disclosed by this document.

Referring to FIG. 4, the blowing pad 50 includes a duct 52 and a main foam 51.

The duct 52 forms a flow path 53 through which air (or cool air or warm air) flows. The main foam 51 is formed of porous polymer, such as polyurethane foam. An air inlet tube 54 is inserted into the main foam 51 through a hole-like air inlet (51c of FIGS. 16 and 17) formed at a rear surface of the main foam 51. A flow path of the air inlet tube 54 is connected to the flow path 53 of the duct 52. As shown in FIG. 3, the air inlet tube 54 is connected to the external blowing pipe 34. A plurality of vent holes 51a are formed at a front surface of the main foam 51 to connect to the flow path 53 of the duct 52. The main foam 51 is covered by an outer sheath (55 of FIG.

19). The outer sheath (55 of FIG. 19) is formed of natural or synthetic fabric or leather having a plurality of vent holes. The air (or cool air or warm air) supplied to the blowing pad 50 through the air inlet tube 54 is blown to a user through the flow path 53 of the duct 52, the plurality of vent holes 51a, and the vent holes of the outer sheath.

Figure 5:
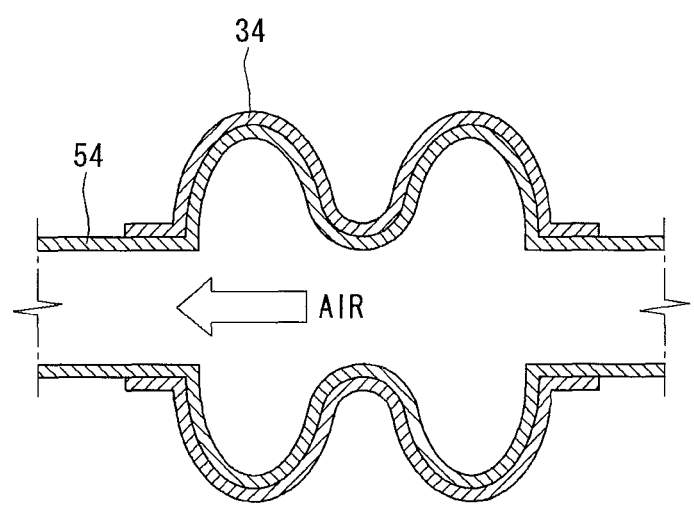
FIG. 5 is a cross-sectional view illustrating that an external blowing pipe is coupled with an air inlet tube of a blowing pad according to an embodiment disclosed by this document.

The air inlet tube 54 and the external blowing pipe 34 are coupled to each other in a manner shown in FIG. 5 to prevent air leakage. For example, as shown in FIG. 5, each of the air inlet tube 54 and the external blowing pipe 34 is treated to have protrusions and depressions at a portion where the air inlet tube 54 and the external blowing pipe 34 are connected to each other. The air inlet tube 54 and the external blowing pipe 34 may be press-fittingly coupled to each other without an adhesive. Such a coupling structure increases the contact area between the air inlet tube 54 and the external blowing pipe 34, thus providing more secure coupling between the air inlet tube 54 and the external blowing pipe 34. Further, an air passage through which air can escape is lengthened so that air leakage may be minimized.

Although it has been illustrated in FIG. 4 that the duct 52 has a cross-section of a rectangle, the embodiments disclosed by this document are not limited thereto. For example, according to embodiments, the duct 52 may be formed in the shape of a pipe, such as a circular pipe, an elliptical pipe, or a polygonal pipe.

The duct 52 is embedded in the main foam 51 during the course of foaming the main foam 51, and integrated with the main foam 51. According to an embodiment, the material of the duct 52, such as natural rubber, synthetic rubber, or non-porous plastic, has a heat distortion temperature higher than a foaming temperature of a porous synthetic resin selected as a material of the main foam 51. The foaming temperature of the main foam 51 is lower than a heat distortion temperature of the duct 52 such that the duct 52 is not heat distorted during the fabrication process that will be described below. For example, according to an embodiment, the synthetic rubber as a material of the duct 52 includes heat-resistant silicon synthetic rubber. The air inlet tube 54 is formed of the same material as the duct 52.

Figure 6:
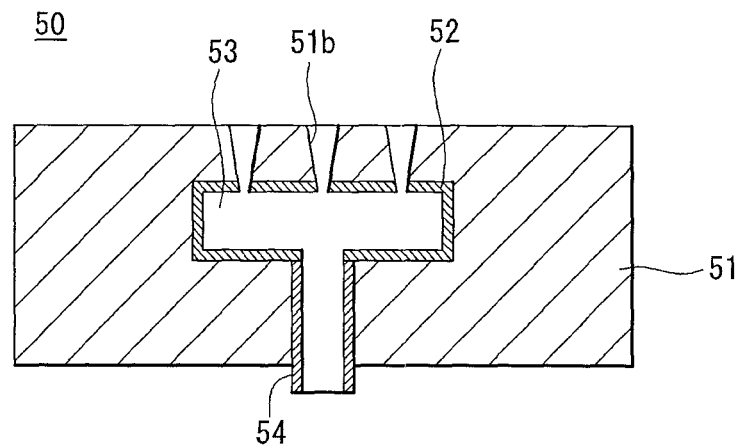
FIG. 6 is a cross-section view illustrating a blowing pad according to an embodiment disclosed by this document.

Each of the vent holes 51a in the main foam 51 may have a diameter constant without respect to the position as shown in FIG. 4, or may have a diameter that increases in a direction of the rear surface of the blowing pact 50 as shown in FIG. 6.

Figure 7:
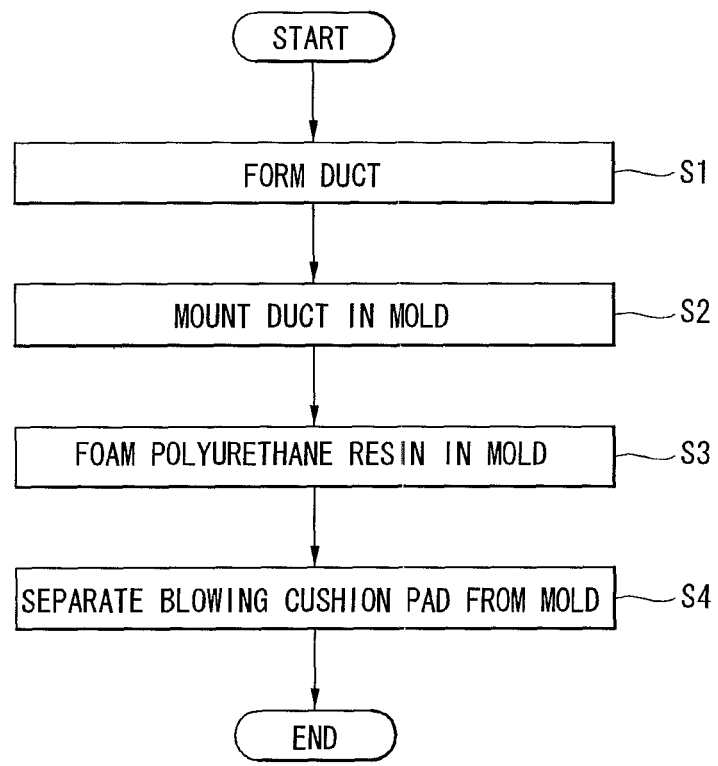
FIG. 7 is a flowchart illustrating a process of fabricating a blowing pad according to an embodiment disclosed by this document.
Figure 8A:
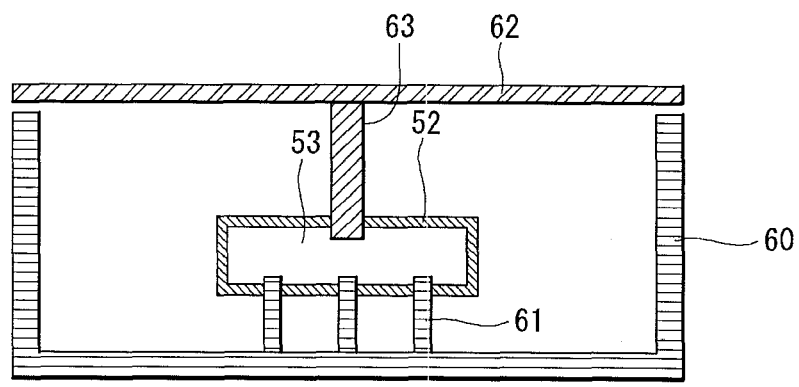
FIGS. 8A, 8B, 9A, 9B, 10A, and 10B are cross-section views illustrating blowing pads according to embodiments disclosed by this document.
Figure 8B:
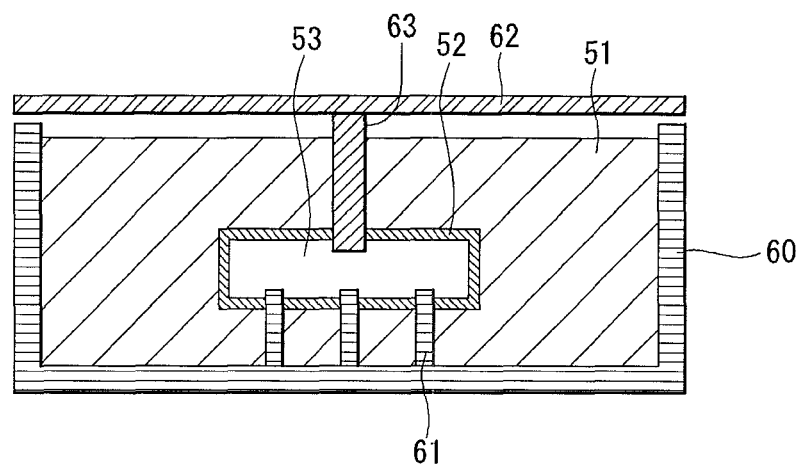
Figure 9A:
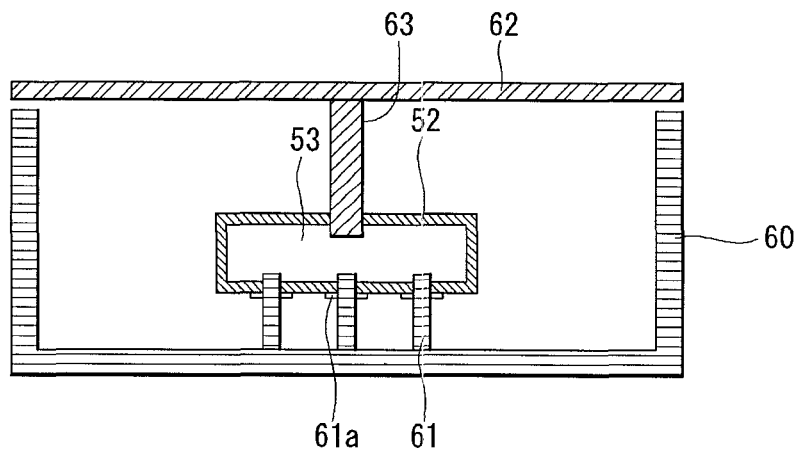
Figure 9B:
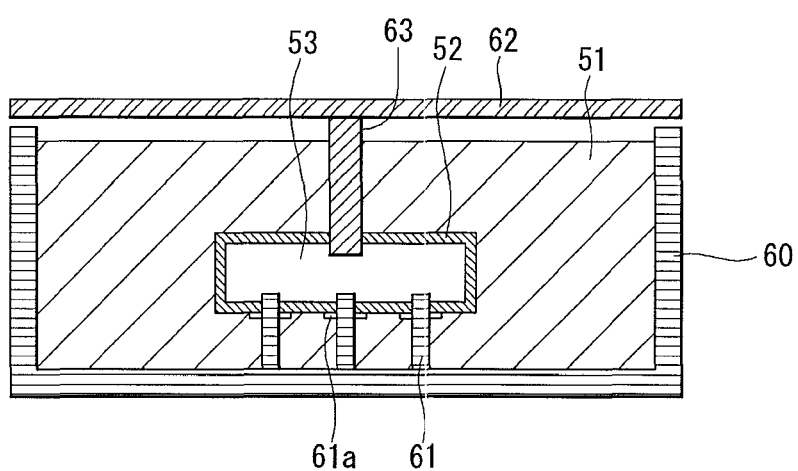
Figure 10A:
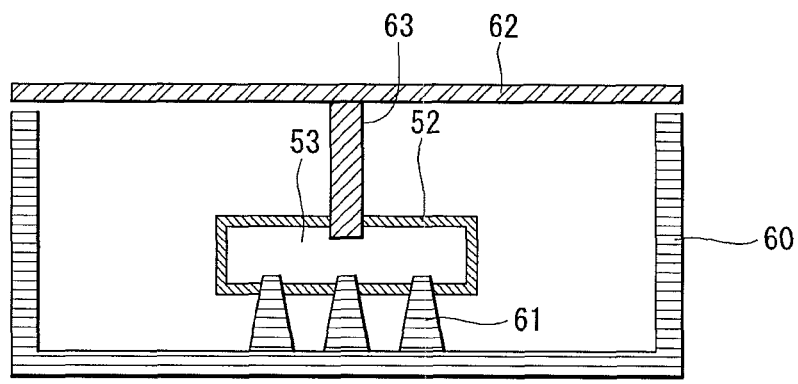
Figure 10B:
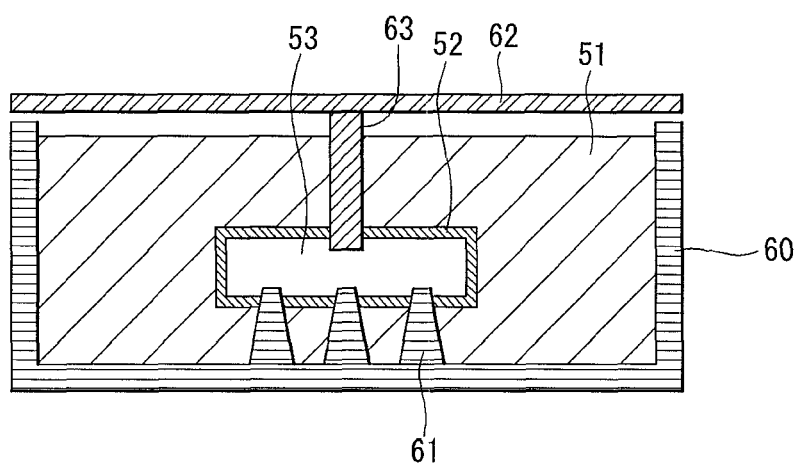

FIG. 7 is a flowchart illustrating a process of fabricating a blowing pad according to an embodiment disclosed by this document. FIGS. 8A, 8B, 9A, and 9B are cross-sectional views illustrating a process of fabricating the blowing pad 50 shown in FIG. 4. FIGS. 10A and 10B are cross-sectional views illustrating a process of fabricating the blowing pad 50 shown in FIG. 6.

In a process of fabricating the blowing pad 50 according to an embodiment disclosed by this document, a porous synthetic resin is foamed with the duct 52 mounted in a mold 60 as shown in FIGS. 8A to 10B so that the duct 52 may be embedded in the main foam 51 simultaneously with the formation of the main foam 51. Referring to FIGS. 8A to 10B, there are in the mold 60 a first core 63 for fixing an upper portion of the duct 52 and a plurality of second cores 61 for fixing a lower portion of the duct 52. The first and second cores 61 and 63 are formed of metal. The first core 63 is fixed on a top cover 62 that covers a space in the mold 60, and the second cores 61 vertically protrude from a bottom surface of the space in the mold 60.

The first core 63 extends in the space of the mold 60 and passes through the rear surface (a top surface as viewed in FIGS. 8A to 10B) of the duct 52 to form an air inlet (51c of FIGS. 16 and 17) of the main foam 51 through which the flow path 53 is inserted during a foaming process of the porous synthetic resin. The first core 63 penetrates the rear surface of the duct 52 to fix the duct 52. By doing so, the duct 52 is suppressed from floating due to a pressure of the porous synthetic resin that increases during the process of foaming the porous synthetic resin.

The second cores 61 extend in the space of the mold 60 through the front surface (lower surface as viewed in FIGS. 8A to 10B) of the duct 52, thereby forming second vent holes that penetrate the main foam 51 during the process of foaming the porous synthetic resin. Further, the second cores 61 penetrate the front surface of the duct 52 to fix the duct 52 so that the duct 52 is suppressed from floating due to a pressure of the porous synthetic resin that increases as foaming progresses. The second cores 61 are formed to have a constant thickness with respect to the position as shown in FIGS. 8A to 9B, or to have a thickness that increases in a direction away from the duct 52 as shown in FIGS. 10A and 10B to prevent the duct 52 from sagging due to the duct's own weight. As shown in FIGS. 9A and 9B, each second core 61 includes a stopper 61a that protrudes from two opposite sides of the second core 61. The stopper 61a supports a lower portion of the duct 52 to prevent the duct 52 from sagging due to the duct's own weight during the process of foaming the porous synthetic resin.

Referring back to FIG. 7, the duct 52 is first formed of any one of natural or synthetic rubber or non-porous plastic (S1). Then, the duct 52 is mounted in a mold (S2).

Subsequently, a porous synthetic resin is injected in the mold 60 to form a main foam, and the mold 60 is heated so that the temperature of the resin rises up to more than a foaming temperature of the resin. As the resin is foamed and the temperature of the mold 60 decreases a room temperature during the process of foaming the porous synthetic resin, the foamed resin is cured (S3). The foaming temperature of the porous synthetic resin is lower than a heat distortion temperature of the duct 52. After the foamed porous synthetic resin is cured, the main foam 51 having the duct 52 therein is separated from the mold 60 (S4). FIG. 4 or 6 shows a cross-section of the main foam 51 separated from the mold 60. Since vent hole 51a or 51b formed in the main foam 51 and the air inlet (51c of FIGS. 16 and 17) of the main foam 51 through which the air inlet tube 54 is inserted are formed while the main foam 51 is simultaneously separated from the first and second cores 61 and 63, there is no need of a separate process for forming the vent holes 51a and 51b and the air inlet (51c of FIGS. 16 and 17).

If the duct 52 is thin in thickness or is formed of a soft material, the duct 52 may be contracted or deformed by a resin pressure exerted during the foaming process of the porous synthetic resin. According to an embodiment, air may be injected into the duct 52 during the foaming process of the porous synthetic resin to prevent deformation of the duct 52 caused by the resin pressure.

Figure 11:
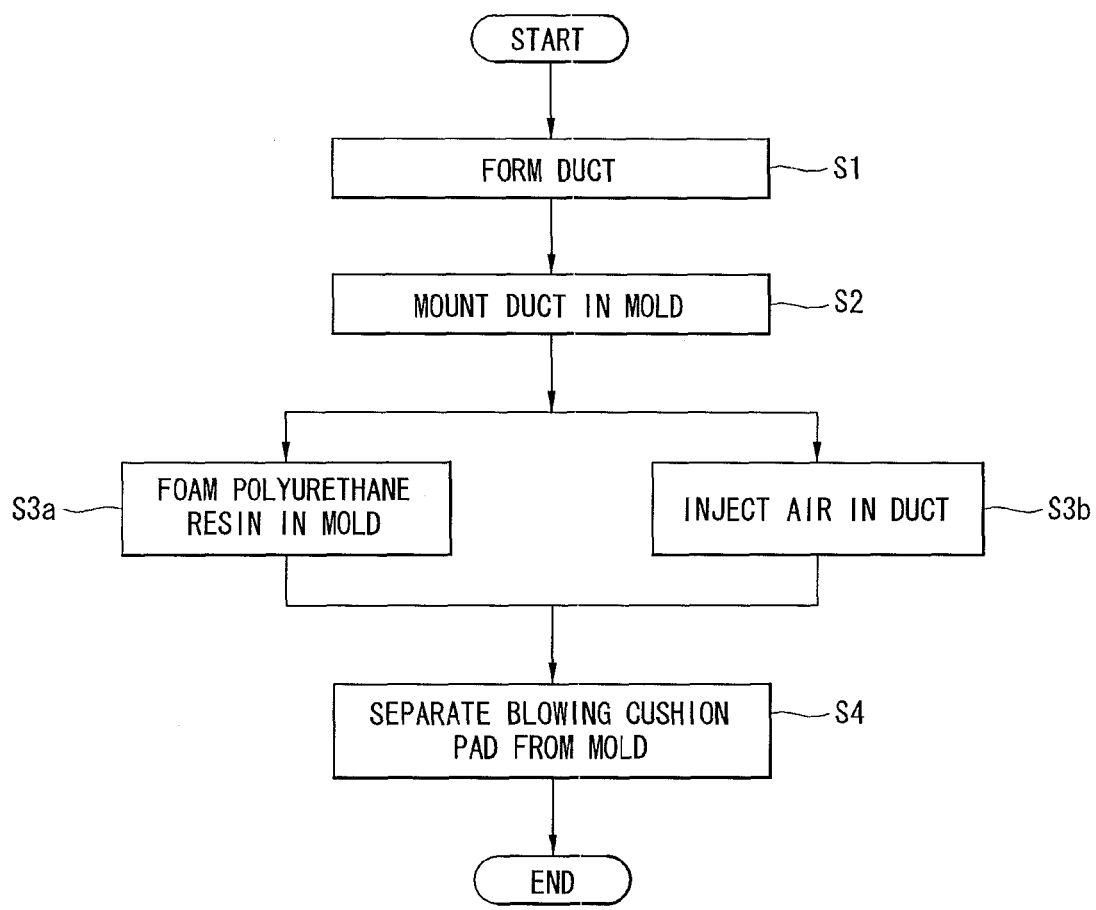
FIG. 11 is a flowchart illustrating a process of fabricating a blowing pad according to an embodiment disclosed by this document.
Figure 12:
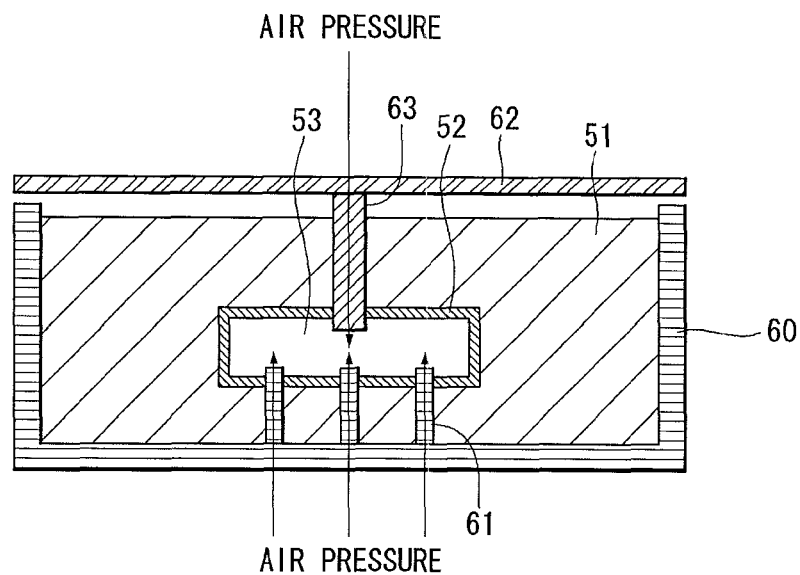
FIGS. 12 to 14 are cross-section views illustrating blowing pads according to embodiments disclosed by this document.
Figure 13:
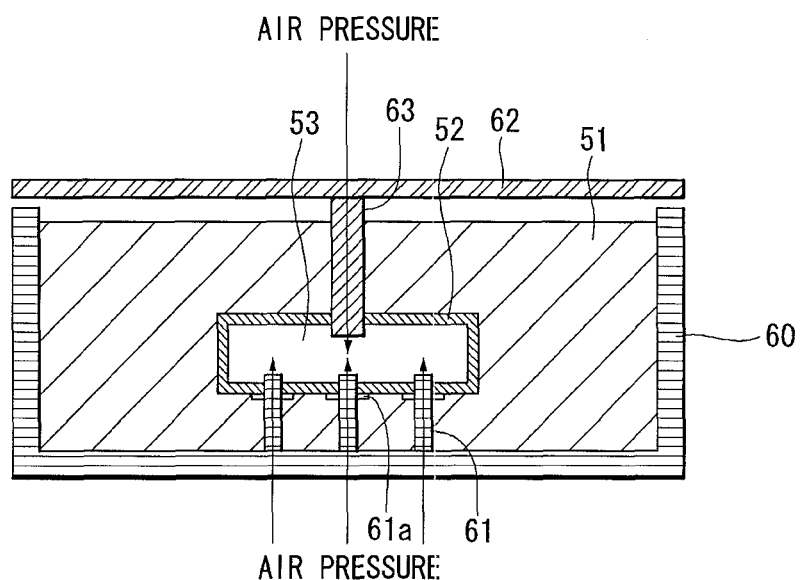
Figure 14:
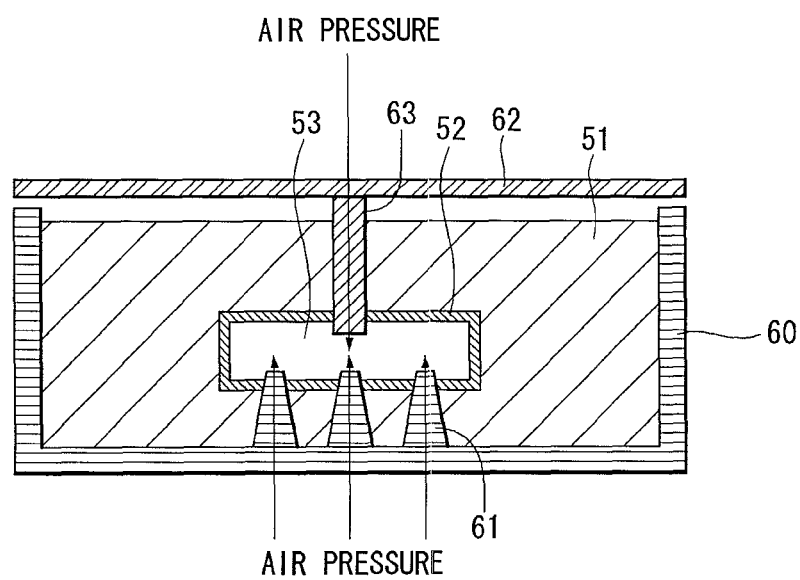

FIG. 11 is a flowchart illustrating a process of fabricating a blowing pad according to an embodiment disclosed by this document. FIGS. 12 and 13 are cross-sectional views for describing a fabrication process of the blowing pad 50 shown in FIG. 4. FIG. 14 is cross-sectional views for describing a fabrication process of the blowing pad 50 shown in FIG. 6.

Referring to FIGS. 11 to 14, the duct 52 is first formed of any one of natural rubber, synthetic rubber, and non-porous plastic to fabricate the blowing pad 50 according to an embodiment disclosed by this document (S1). Subsequently, the duct 52 is mounted in the mold 60 (S2). The first core 63 and the second cores 61 are formed in the space of the mold 60. A nozzle is formed in at least one of the cores 61 and 63 to inject air into the duct 52. An air compressor is connected to the cores 61 and 63 having the nozzle formed therein so that high-pressure air is supplied into the duct 52.

When the duct 52 is mounted in the mold 60, a porous synthetic resin for the main foam is injected into the mold 60, and the mold 60 is heated so that the temperature of the resin rises up to more than a foaming temperature of the resin (S3a). While the foaming of the porous synthetic resin is in progress, a predetermined pressure of air is injected into the duct 52 through at least one of the cores 61 and 63 to expand the duct 53 (S3b). The foamed porous synthetic resin is cured as the mold 60 is cooled. The foaming temperature of the porous synthetic resin is lower than a heat distortion temperature of the duct 52. After the porous synthetic resin is cured, the main foam 51 having the duct 52 therein is separated from the mold 60 (S4). FIG. 4 or 6 show a cross-section of the main foam 51 separated from the mold 60. Since vent hole 51a or 51b and the air inlet (51c of FIGS. 16 and 17) are formed in the main foam 51 while the main foam 51 is simultaneously separated from the first and second cores 61 and 63, there is no need of a separate process for forming the vent holes 51a and 51b and the air inlet.

Figure 16:
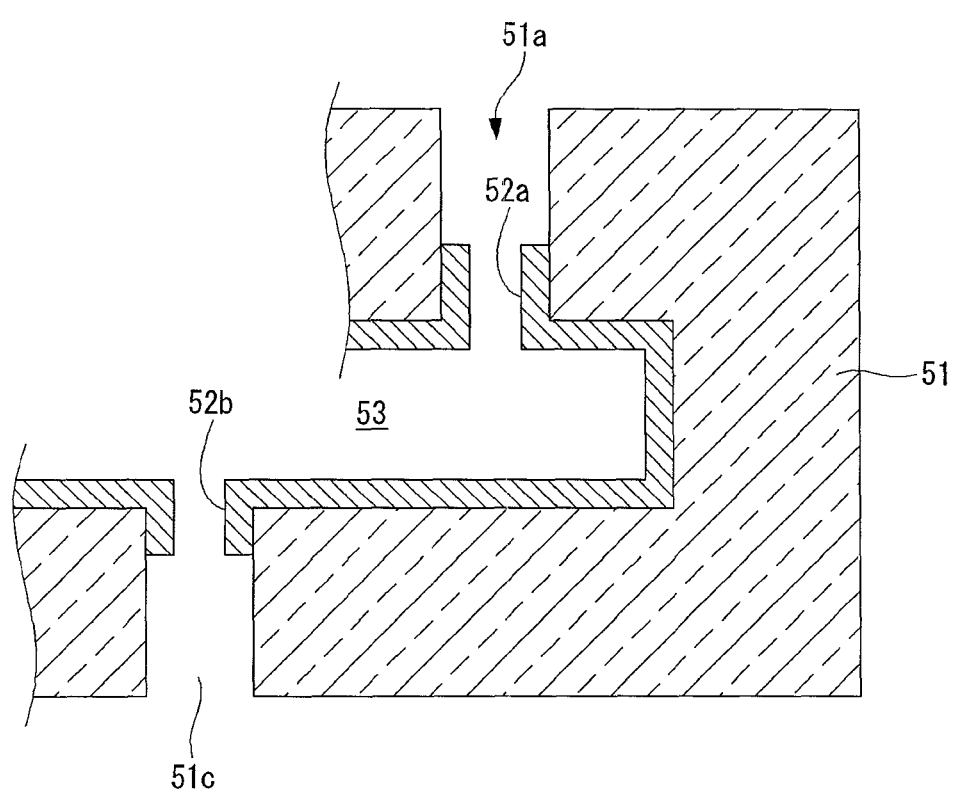
FIG. 16 is a cross-sectional view illustrating a blowing pad according to an embodiment disclosed by this document.
Figure 17:
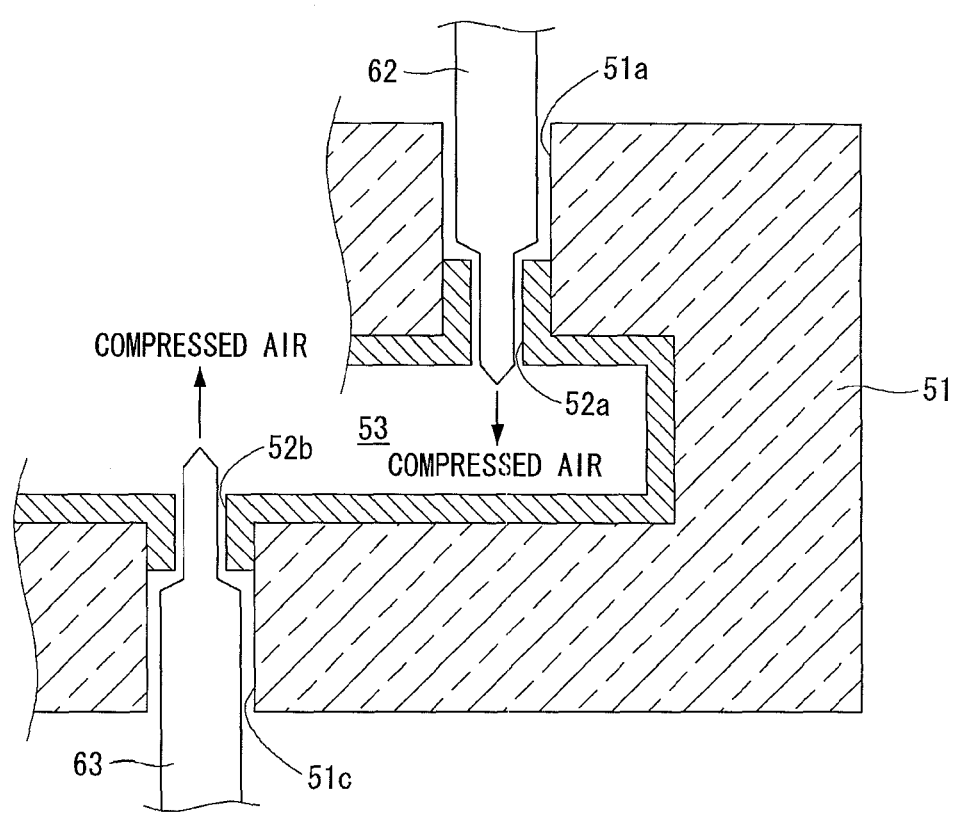
FIG. 17 is a cross-sectional view illustrating a blowing pad according to an embodiment disclosed by this document, wherein cores are provided in a mold to form the vent holes and the air inlet shown in FIG. 16.

FIG. 16 is a cross-sectional view illustrating a connection structure between the duct 52 and the vent hole 51a. FIG. 17 is a cross-sectional view illustrating a structure of the mold 60 for forming the vent hole 51a and the air inlet 51c shown in FIG. 16.

A long-term use of the blowing pad 50 may cause the main foam 51 to be separated from the duct 52, so that the vent hole 51a and the air inlet 51c may be clogged by the duct 52. To prevent this, protrusions 52a and 52b are formed in the duct 52, which extend through the vent hole 51a and the air inlet 51c, respectively.

The protrusions 52a and 52b of the duct 52 serve as stoppers to prevent the duct 52 from floating or being separated from the main foam 51. Accordingly, even if the blowing pad 50 is used during a long period, the vent holes 51a and the air inlet 51c are prevented from being narrowed or clogged. The protrusions 52a and 52b of the duct 52 are formed of the same material as the duct 52 simultaneously with the formation of the duct 52. According to an embodiment, as the vent holes 51a and the air inlet 51c are stepped due to the protrusions 52a and 52b, cores 61 and 63 have a stepped structure correspondingly as shown in FIG. 17.

Figure 15:
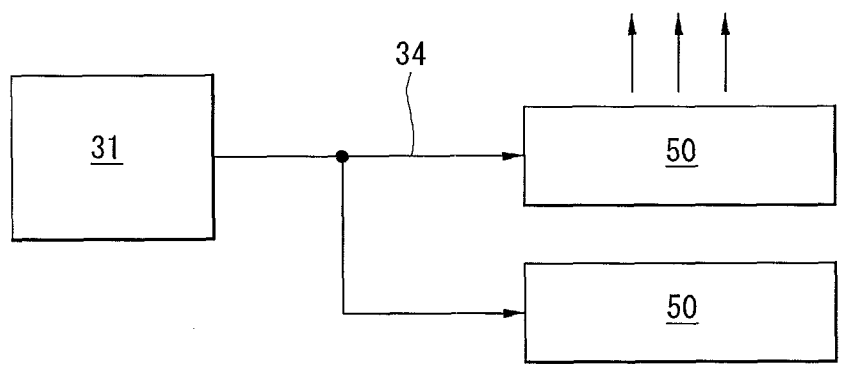
FIG. 15 is a block diagram illustrating a blowing system according to an embodiment disclosed by this document.

In contrast to the conventional duct formed of a porous synthetic resin, the duct 52 according to the embodiments disclosed by this document is formed of natural rubber, synthetic rubber, or non-porous plastic having high durability, elasticity, and density in structure. As a result, the blowing pad 50 may minimize air leakage from the duct 52, thus leading to an increase in blowing efficiency. Thus, as shown in FIG. 15, the blowing apparatus 31 may be directly coupled with the blowing pad 50 via the external blowing pipe 34 without the need of providing a blowing fan between the blowing apparatus 31 and the blowing pad 50. This contributes to a decrease in noise and costs.

Hereinafter, embodiments of a blowing system will be described that include an air processing unit that is installed in an external blowing pipe connected to each of blowing pads 50 and may control the amount of air supplied to each of the blowing pads 50.

Figure 18:
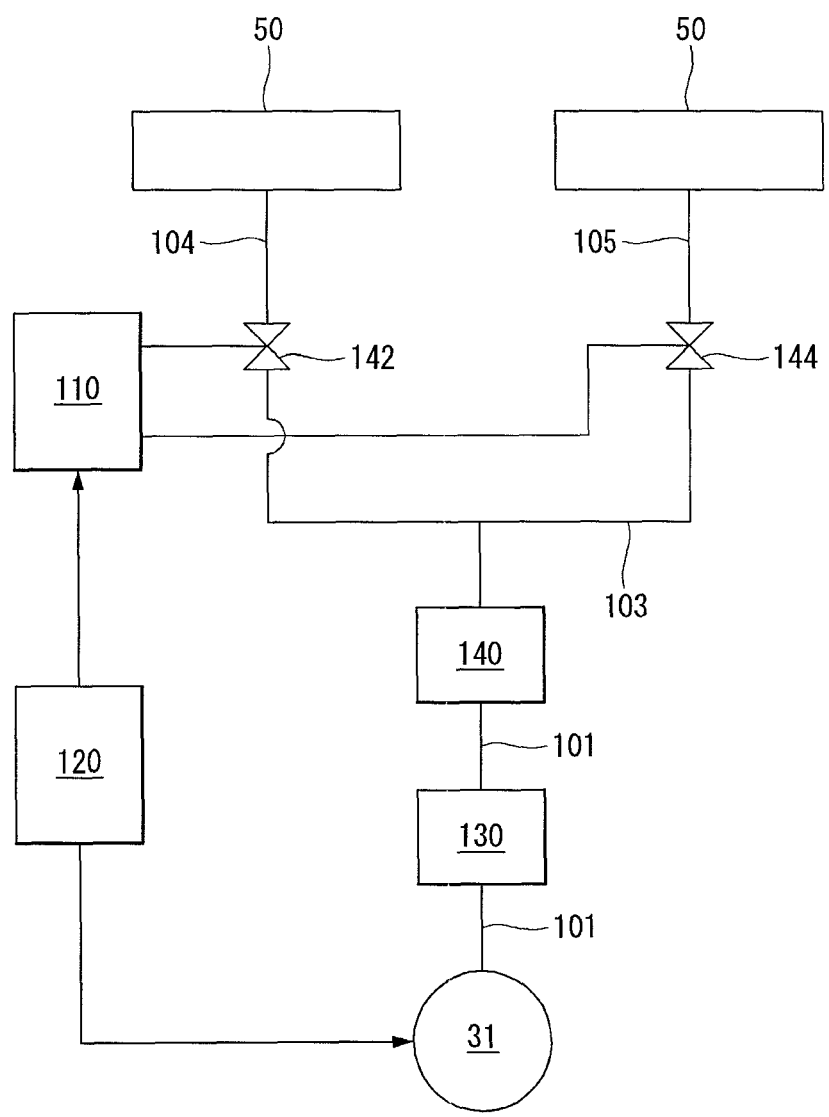
FIG. 18 is a pneumatic circuit diagram illustrating a blowing system according to an embodiment disclosed by this document.
Figure 19:
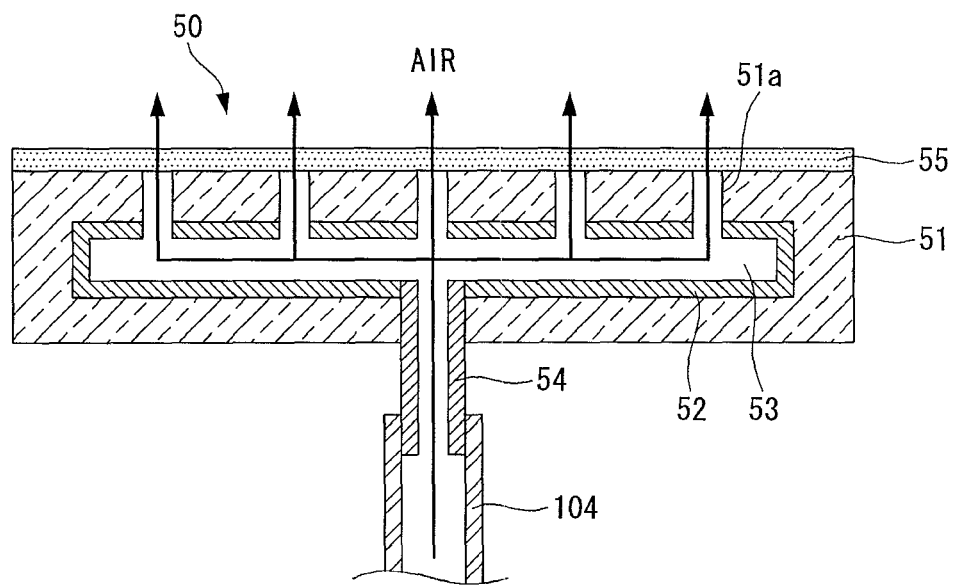
FIG. 19 shows cross-sectional views illustrating the blowing pads shown in FIG. 18.
Figure 19:
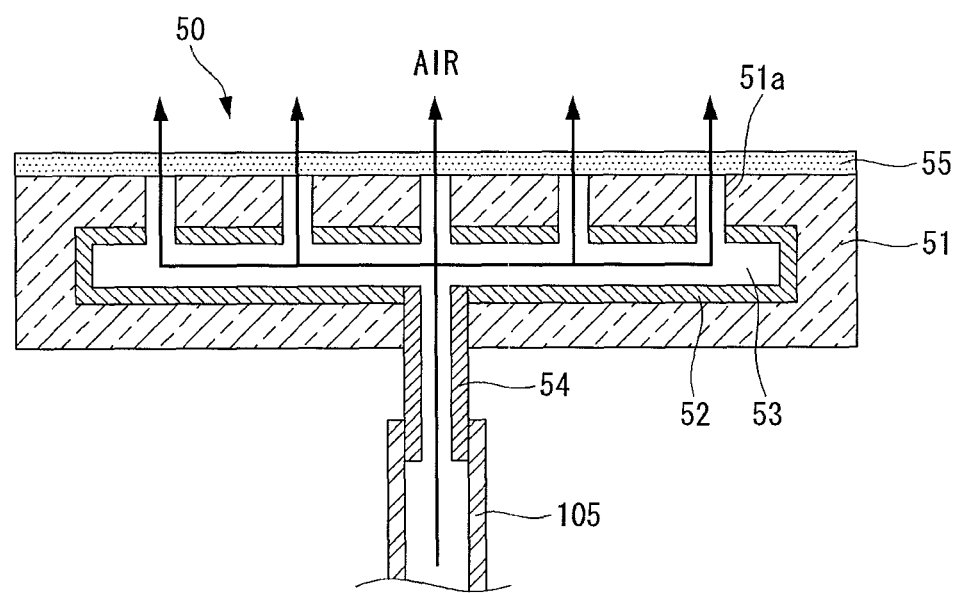

FIG. 18 is a pneumatic circuit diagram illustrating a blowing system according to an embodiment disclosed by this document. FIG. 19 shows cross-sectional views illustrating the blowing pads shown in FIG. 18.

Referring to FIGS. 18 and 19, a blowing system according to an embodiment disclosed by this document includes a plurality of blowing pads 50, a blowing apparatus 31, an electronic control unit ("ECU") 110, and a plurality of electronic valves 142 and 144.

The blowing pads 50 may be separated from each other for each user or to face different portions of a user. For example, one of the blowing pads 50 (hereinafter, referred to as "first blowing pad") may be included in a driver's seat of a vehicle or in a first bed mat. The other blowing pad 50 (hereinafter, referred to as "second blowing pad") may be included in a passenger seat of the vehicle or in a second bed mat. According to an embodiment, the first blowing pad 50 may be included in a backrest of the driver's seat or in a portion of a bed mat that faces a patient's head. According to an embodiment, the second blowing pad 50 may be included in a seat base of the driver's seat or in a portion of the bed mat facing a patient's arm or leg. Each blowing pad 50 is connected to an air inlet tube 54 and includes a duct 52. Cross-sections of the blowing pads 50 are shown in FIG. 19, and a method of fabricating the blowing pads 50 are the same or substantially the same as the method described in connection with FIGS. 7 to 14.

The blowing apparatus 31 may be implemented as a general blowing apparatus that blows air without air conditioning functions, such as air cooling or heating. According to an embodiment, the blowing apparatus 31 may be realized as an air conditioner that may generate cool or warm air depending on a user's selection. The blowing apparatus 31 is connected to the blowing pads 50 via external blowing pipes including first to fourth external pipes 101, 103, 104, and 105.

The blowing apparatus 31 is connected to the first external blowing pipe 101. Air (or cool or warm air) is generated from the blowing apparatus 31 and supplied to the blowing pads 50 through the first external blowing pipe 101. The first external blowing pipe 101 includes an air processing unit 130 and an air storage unit 140.

The air processing unit 130 is detachably connected to the first external blowing pipe 101, and dissipates one or more of fragrance, anions, and far infrared rays or sterilizes harmful bacteria in the air. The air processing unit 130 may also purify air flowing through the first external blowing pipe 101 or absorb moisture in the air for humidity control. Exemplary structures of the air processing unit 130 are shown in FIGS. 20 to 26.

The air storage unit 140 is connected to the first external blowing pipe 101. The air storage unit 140 includes an air storing room that has a larger volume than that of the first external blowing pipe 101. The air storage unit 140 stores air (or cool or warm air) passing through the air processing unit 130 to sufficiently increase or make uniform the amount of air supplied to the second external blowing pipe 103. According to an embodiment, the air storage unit 140 may be omitted as long as a flow rate of air (or cool or warm air) flowing through the second external blowing pipe 103 is kept constant.

The second external blowing pipe 103 evenly distributes air (or cool or warm air) supplied from the air storage unit 140 to the blowing pads 50. A first branch of the second external blowing pipe 103 is connected to the third external blowing pipe 104 through the first electronic valve 142. A second branch of the second external blowing pipe 103 is connected to the fourth external blowing pipe 105 through the second electronic valve 144. The third external blowing pipe 104 is connected to the air inlet tube 54 of the first blowing pad 50, and the fourth external blowing pipe 105 is connected to the air inlet tube 54 of the second blowing pad 50.

The ECU 110 controls current flowing through a solenoid coil of each of the electronic valves 142 and 144 depending on a predetermined value, and adjusts a degree of opening/closing of the electronic valves 142 and 144. The degree of opening/closing of the electronic valves 142 and 144 may be adjusted by changing setting values of the ECU 110 according to a use environment. Accordingly, the embodiments disclosed by this document may optimize the amount of air supplied to each of the blowing pads 50 to be suitable for the use environment. For example, the ECU 110 may supply 70% of air (or cool or warm air) flowing through the second external blowing pipe 103 to the first blowing pad 50 and 30% of the air to the second blowing pad 50 by making an opening degree of the first electronic valve 142 larger than an opening degree of the second electronic valve 144. The ECU 110 may make the amount of air supplied to the blowing pads 50 uniform by controlling the electronic valves 142 and 144 so that the opening degrees of the valves 142 and 144 are the same as each other.

The blowing apparatus 31 and the ECU 110 are connected to a power supply switch 120. When the power supply switch 120 is turned on by a user, the blowing apparatus 31 and the ECU 110 are supplied with power and begin to operate.

Figure 20:
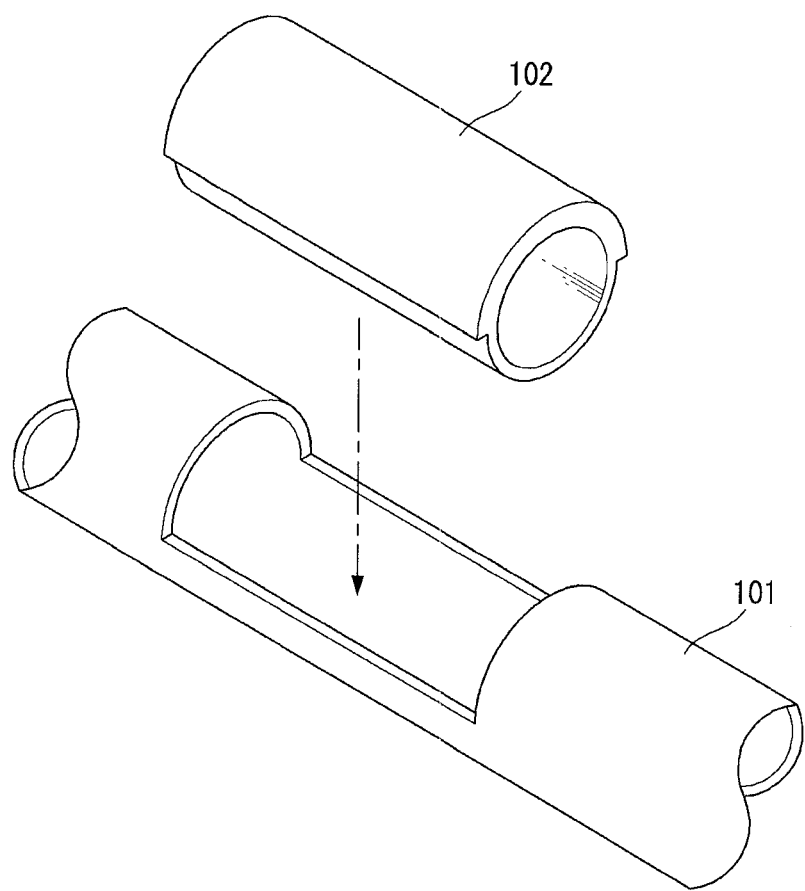
FIG. 20 is a perspective view illustrating an exchangeable filter having the air processing unit shown in FIG. 18.

FIG. 20 is a perspective view illustrating an exchangeable filter 120 that includes an air processing unit 130.

Figure 26:
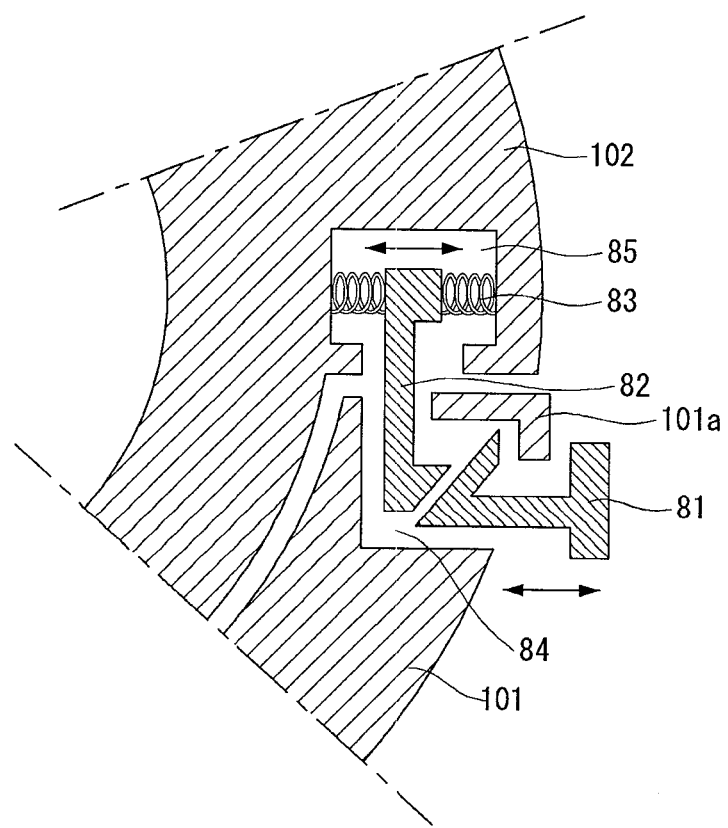
FIG. 26 is a cross-sectional view illustrating a locking device that detachably couples an external blowing pipe with an exchangeable filter.

Referring to FIG. 20, the exchangeable filter 102 is detachably coupled with at least one of the external blowing pipes 101, 103, 104, and 105. Hereinafter, an embodiment will be described with respect to coupling between the first external blowing pipe 101 and the exchangeable filter 102, however, this embodiment may also apply with respect to coupling between the exchangeable filter 102 and each of the external blowing pipes 103, 104, and 105. A portion of the exchangeable filter 102 is cut out to expose a portion of a blowing path in the first external blowing pipe 101. The exchangeable filter 102 has step portions that are engaged with cut surfaces of the first external blowing pipe 101. The exchangeable filter 102 is formed in the shape of a pipe having a blowing path that is included in the blowing path of the first external blowing pipe 101. A portion of the exchangeable filter 102 is inserted in the first external blowing pipe 101 through the cut-out portion of the first external blowing pipe 101. The exchangeable filter 102 and the first external blowing pipe 101 are detachably coupled to each other through structures that are engaged to each other, or through an adhesive tape that may be readily removed. As shown in FIG. 26, the first external blowing pipe 101 and 102 may be coupled with each other through a locking device, and may be easily separated from each other by a releasing button of the locking device. Under a situation where the first external blowing pipe 101 is not subject to severe floating, the exchangeable filter 102 may be coupled with the first external blowing pipe 101 without an adhesive tape or locking device.

Figure 21:
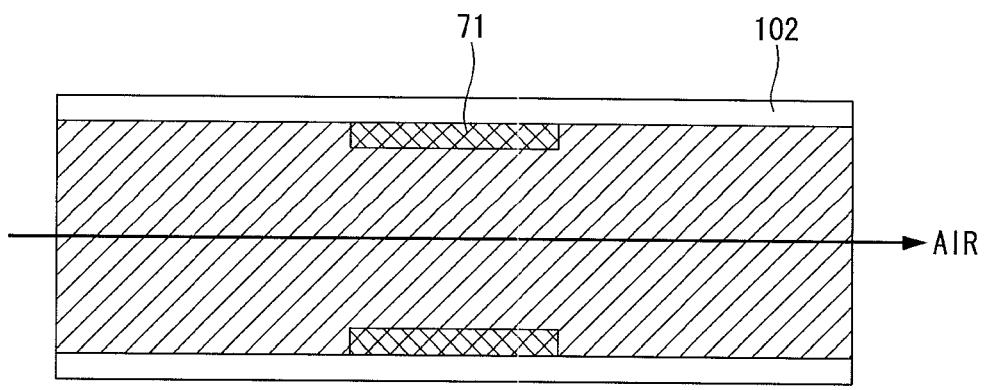
FIG. 21 is a transversal cross-sectional view illustrating an exemplary inner structure of the exchangeable filter shown in FIG. 20.
Figure 22:
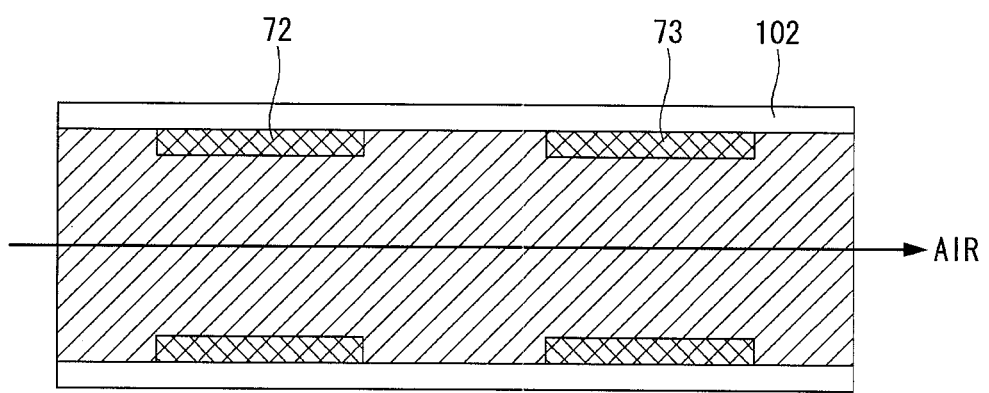
FIG. 22 is a transversal cross-sectional view illustrating an exemplary inner structure of the exchangeable filter shown in FIG. 20.
Figure 23:
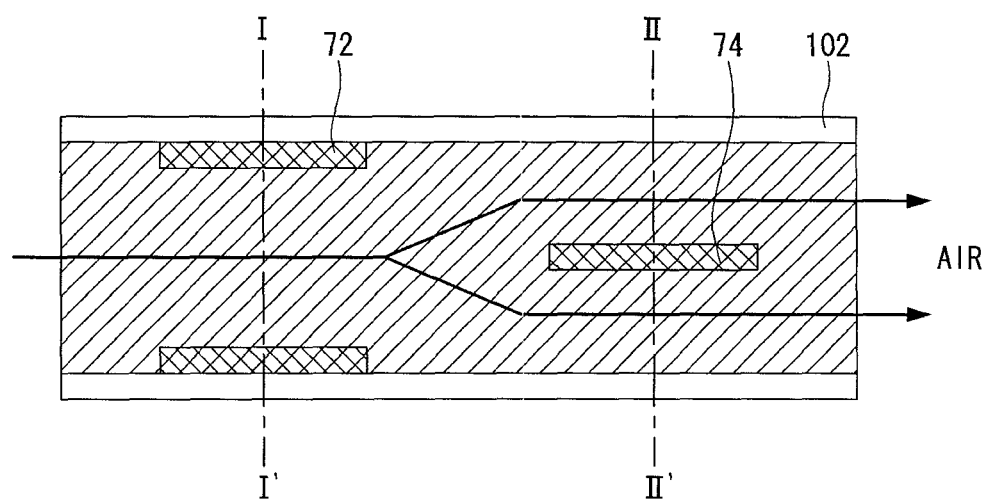
FIG. 23 is a transversal cross-sectional view illustrating an exemplary inner structure of the exchangeable filter shown in FIG. 20.

Various air processing pads may be arranged in the exchangeable filter 102 as shown in FIGS. 21 to 23. The air processing pads are positioned in the exchangeable filter 102 not to interfere with air flow in the exchangeable filter 102.

Figure 24:
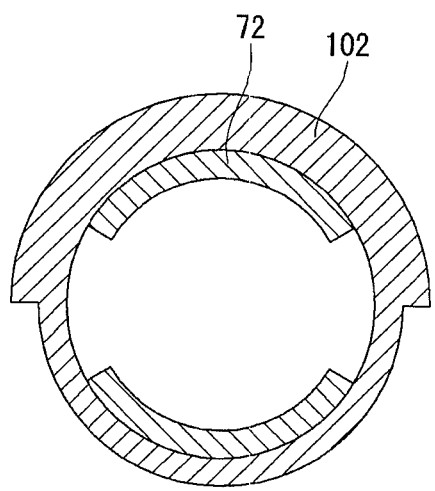
FIG. 24 is a cross-sectional view of the exchangeable filter which is taken along line I-I' of FIG. 23.
Figure 25:
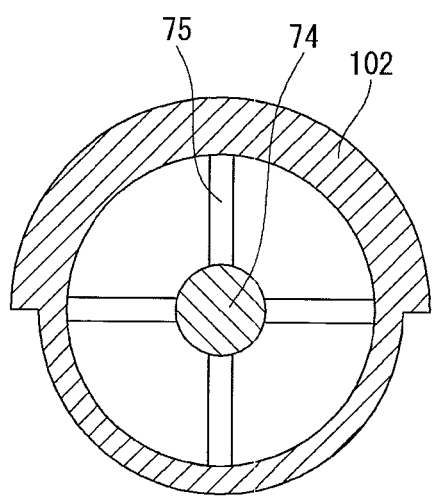
FIG. 25 is a cross-sectional view of the exchangeable filter which is taken along line II-II' of FIG. 23.

FIGS. 21 to 23 are cross-sectional views illustrating various air processing pads installed in the power supply switch 120. FIG. 24 is a cross-sectional view of the exchangeable filter 102 which is taken along line I-I' of FIG. 23. FIG. 25 is a cross-sectional view of the power supply switch 120 which is taken along line II-IF of FIG. 23.

Referring to FIGS. 21 to 23, one or more air processing pads are attached on an inner wall of the exchangeable filter 102. The air processing pads 71 to 74 may include one or more of a fragrant material, a deodorant material, a far infrared ray emission material, anion emission material, an air purification material, a dehumidifying material, an antibiotic material, and sterilization material. The fragrant material may include various natural fragrance dissipation materials that have aroma therapeutic effects. According to an embodiment, the air processing pads 71 to 73 each may be implemented as any commercially available pad or filter with the above functions.

The air processing pads 71 to 73 are attached on an inner wall of the exchangeable filter 102 as shown in FIGS. 21 to 23, and thus the air processing pads 71 to 73 rarely play as an obstacle to air flow in the exchangeable filter 102.

The air processing pad 74 may be positioned at a central portion of a blowing path of the exchangeable filter 102 as shown in FIGS. 23 and 25. One or more supports 75 may be provided between an inner wall of the exchangeable filter 102 and the air processing pad 74 so that the air processing pad 74 may be fixed at the central portion of the exchangeable filter 102. The supports 75 are formed to have a thin thickness and to have a sufficient interval distance between the supports 75 not to hinder air flow.

FIG. 26 is a cross-sectional view illustrating a locking device that detachably couples the first external blowing pipe 101 with the exchangeable filter 102. Hereinafter, an embodiment of the locking device between the first external blowing pipe 101 and the exchangeable filter 102 is described for convenience of description, however, the locking device may also apply as is between one of the external blowing pipes 103, 104, and 105 and the exchangeable filter 102.

Referring to FIG. 26, the first external blowing pipe 101 includes a locking room 84 under a cut-out surface of the first external blowing pipe 101. A release button 81 is provided in the locking room 84 in a freely moving manner. A space 85 is provided in a step portion of the exchangeable filter 102 for a hook 82 and a spring 83 to be installed. An end of the hook 82 extends through the step portion of the exchangeable filter 102 up to the locking room 84. When the exchangeable filter 102 is inserted into the first external blowing pipe 101, the step portions of the exchangeable filter 102 are engaged to the cut-out surfaces of the first external blowing pipe 101. Simultaneously, an end of the hook 82 is inserted into the locking room 84 of the first external blowing pipe 101. The hook 82 is locked to the release button 81 by a restoring force of the spring 83 with the first external blowing pipe 101 and the exchangeable filter 102 coupled to each other, and the hook 82 is restricted in the locking room 84 by a stopper 101a of the first external blowing pipe 101. By a user to push the release button 81 to attempt to replace the air processing pads 71 to 74, the hook 82 is pushed back so that the hook 82 is removed from the locking room 84, thus allowing the exchangeable filter 102 to be easily separated from the first external blowing pipe 101.

Figure 27:
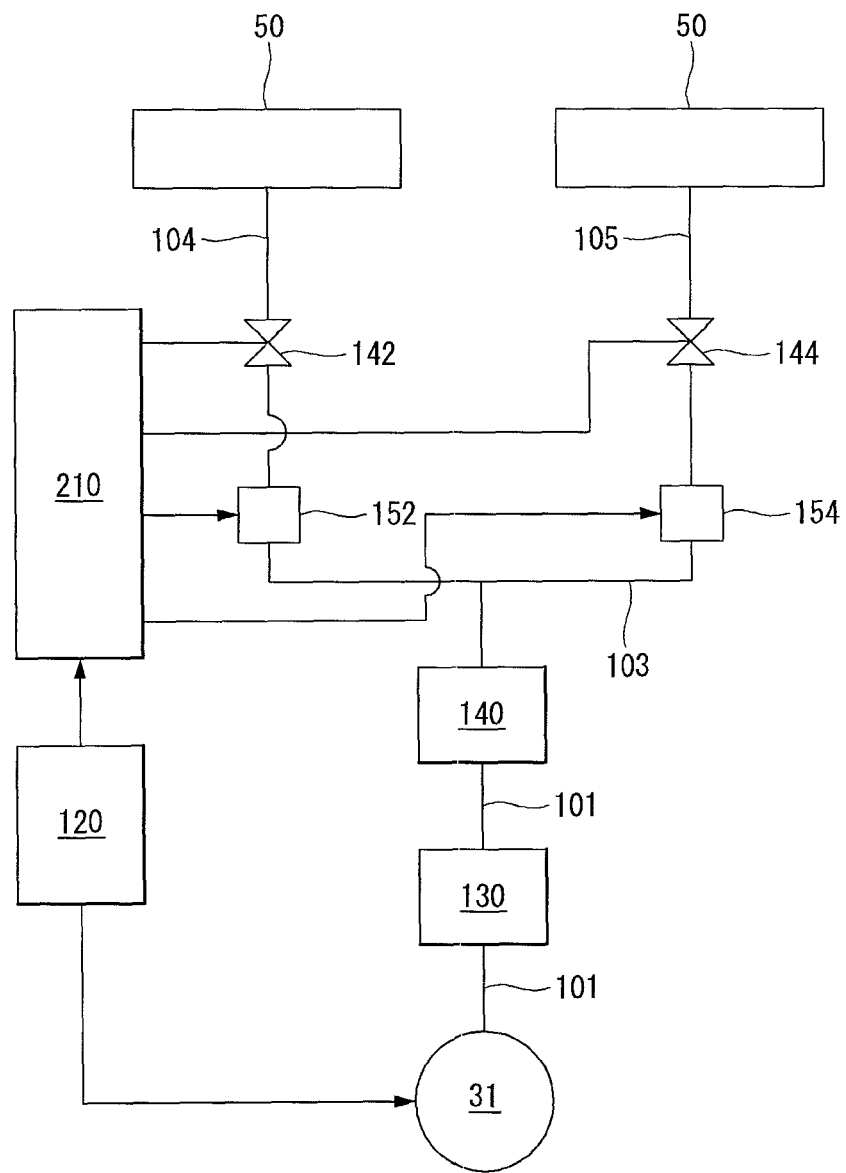
FIG. 27 is a pneumatic circuit diagram illustrating a blowing system according to an embodiment disclosed by this document.

FIG. 27 is a pneumatic circuit diagram illustrating a blowing system according to an embodiment disclosed by this document.

Referring to FIG. 27, a blowing system according to an embodiment disclosed by this document includes thermoelectric elements 152 and 154 for individually controlling temperature of air (or cool or warm air) supplied to each blowing pad 50 and an ECU 210 for controlling the thermoelectric elements 152 and 154 in addition to the structure shown in FIG. 18.

The first thermoelectric element 152 is connected to the third external blowing pipe 104 and increases or decreases temperature of air supplied to the first blowing pad 50 under control of the ECU 210. The second thermoelectric element 154 is connected to the fourth external blowing pipe 105 and increases or decreases temperature of air supplied to the second blowing pad 50. According to an embodiment, the thermoelectric elements 152 and 154 may adjust temperature of air flowing through the blowing pipes 104 and 105 by exothermic or endothermic reactions based on Peltier effect.

The ECU 210 controls current flowing through the solenoid coils of the electronic valves 142 and 144 depending on a predetermined value to adjust a degree of opening/closing of the electronic valves 142 and 144. The ECU 210 separately controls currents supplied to the thermoelectric elements 152 and 154 according to a predetermined value to individually adjust temperature of the blowing pads 50.

Figure 28:
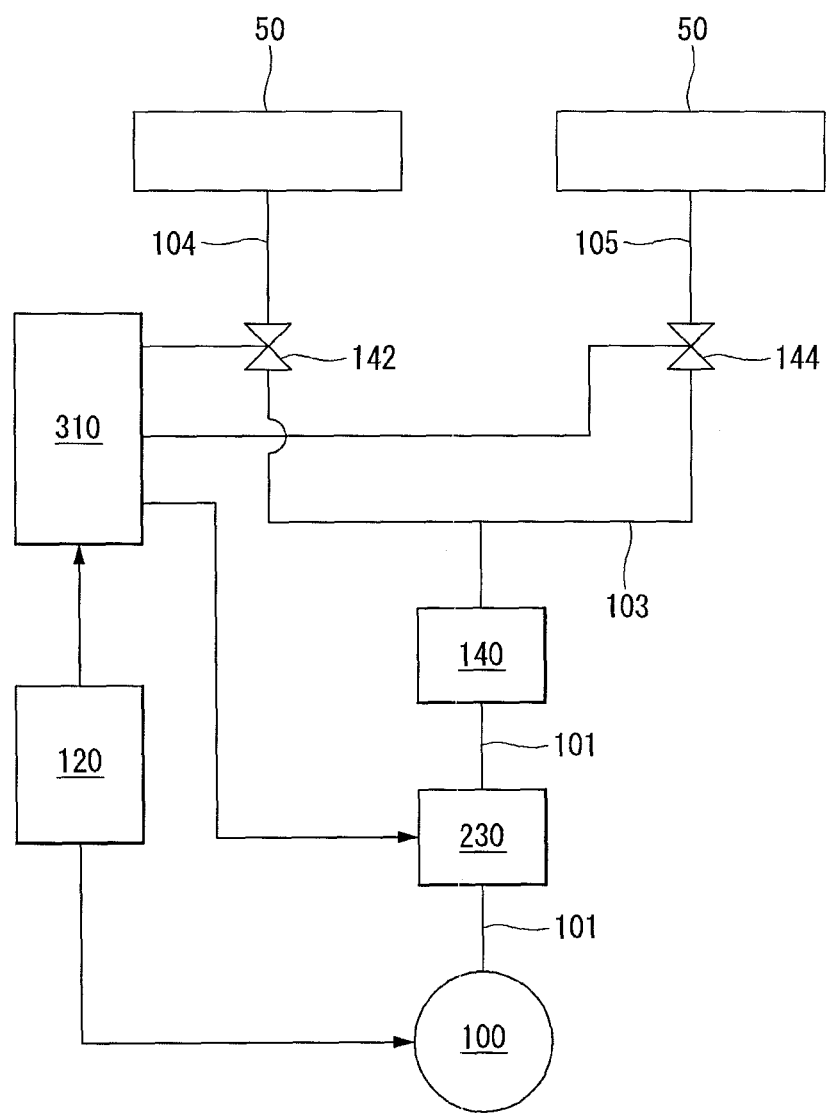
FIG. 28 is a pneumatic circuit diagram illustrating a blowing system according to an embodiment disclosed by this document.

FIG. 28 is a pneumatic circuit diagram illustrating a blowing system according to an embodiment disclosed by this document.

Referring to FIG. 28, a blowing system according to an embodiment disclosed by this document includes blowing pads 50, an automatic air processing unit 230, and an ECU 310. The external blowing pipes 101, 103, 104, and 105 may include the electronic valves 142 and 144 and the thermoelectric elements 152 and 154 shown in FIG. 27.

Figure 29:
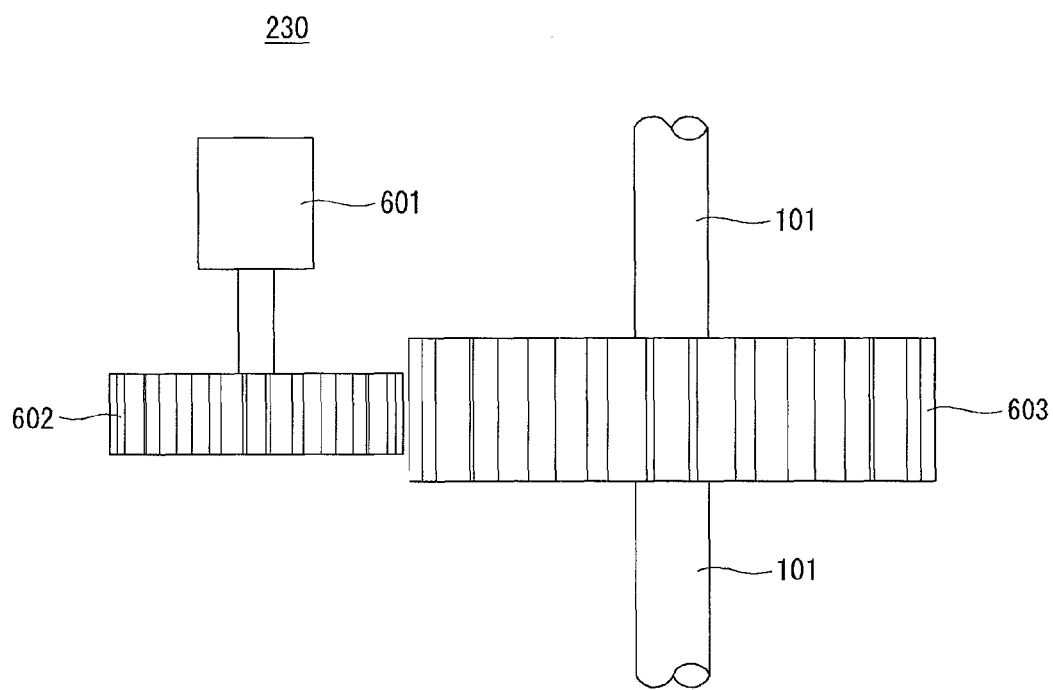
FIG. 29 is a view illustrating the motor, gear, and exchangeable filter of the automatic air processing unit shown in FIG. 28.
Figure 30:
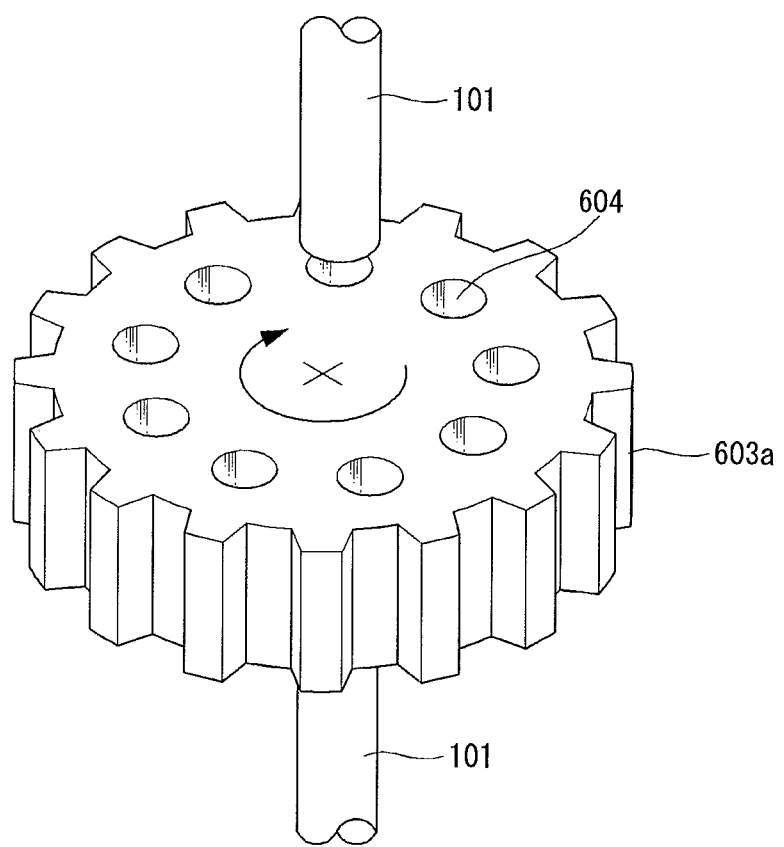
FIG. 30 is a perspective view illustrating a structure of the exchangeable filter shown in FIG. 29.

The automatic air processing unit 230 may be implemented as shown in FIGS. 29 and 30. The automatic air processing unit 230 includes a motor 601 driven by a motor driver (not shown) and an exchangeable filter 603 that rotates in operable association with the motor 601. The motor driver drives the motor 601 under control of the ECU 310. A gear 602 is connected to a rod of the motor 601. On an outer circumferential surface, the exchangeable filter 603 includes teeth that are engaged with the teeth of the gear 602. A plurality of blowing pipes 604 each having at least one of air processing pads 71 to 74 are provided in the exchangeable filter 603. When the gear 602 rotates cooperatively with the motor 601, the mold 603 engaged with the gear 602 rotates correspondingly, so that the mold 603 changes the blowing pipes 603 to be connected to the first external blowing pipe 101. As such, as the motor 601 rotates, the air processing pads 71 to 74 may be shifted.

The ECU 310 controls currents flowing through the solenoid coils of the electronic valves 142 and 144 depending on a predetermined value to adjust a degree of opening/closing of the electronic valves 142 and 144. Further, the ECU 310 controls the motor driver pursuant to a predetermined value to rotate the mold 603, thus resulting in exchange of the air processing pads. A user may exchange the air processing pads 71 to 74 and change an exchange period by changing setting values of the ECU 310. Further, as described above in connection with FIG. 27, the ECU 310 may individually control currents supplied to the thermoelectric elements 152 and 154 depending on a predetermined value to adjust temperature of each blowing pad 50.

The ECUs 110, 410, and 510 each may vary setting values according to a user's command received from a user input device, such as a remote controller, through a wired/wireless interface, and may control each of the electronic vales 142 and 144, the thermoelectric elements 152 and 154, and the mold 603 in response to the user's input.

Although it has been illustrated in FIGS. 18, 27, and 28 that the number of the blowing pads 50 is two for ease of description, the number is not limited to two, and two or more blowing pads 50 may be provided according to embodiments. Further, as the number of the blowing pads varies, the number of the electronic valves and/or the number of the thermoelectric elements may be changed correspondingly.

As described above, the embodiments disclosed by this document enables fabrication of a blowing pad with a minimum number of processes as shown in FIGS. 7 and 11. Further, the embodiments disclosed by this document may provide a duct 52 with considerably increased durability and elasticity compared to the existing porous synthetic resin, so that even after the duct 52 has been subjected to a long-term load, the duct 52 may be nearly restored to the original form, thus resulting in an increase of lifespan of the blowing pad 50. The blowing pad 50 according to the embodiments disclosed by this document may have various applications. For example, the blowing pad 50 may be applicable to a seat for transportations, such as vehicles, ships, or airplanes, a massage chair, an office chair, or a bed mat for patients.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Having described the invention, and a preferred embodiment thereof, what I claim as new, and secured by Letters Patent is:

1. A blowing system comprising: a blowing apparatus; first and second blowing pads; an external blowing pipe that forms a first air flow path between the blowing apparatus and the first and second blowing pads; and an air processing unit that is detachably provided in the external blowing pipe, wherein each of the first and second blowing pads includes a main foam formed of a foamed porous synthetic resin; and a duct embedded in the main foam, wherein the main foam includes an air inlet to which an air inlet tube is inserted and a plurality of vent holes, each of which is connected to the duct, wherein the duct is formed of any one of natural rubber, synthetic rubber, and non-porous plastic, wherein the air inlet tube is connected to the external blowing pipe, wherein the air processing unit includes one or more of a fragrant material, a deodorant material, a far infrared ray material, anion emission material, an air purification material, a dehumidifying material, an antibiotic material, and sterilization material, and wherein the air processing unit includes a second air flow path that is connected to the first air flow path formed by the external blowing pipe.

2. The blowing system of claim 1, further comprising: a first electronic valve that is provided in the external blowing pipe between the external blowing pipe and the first blowing pad to adjust the amount of air supplied to the first blowing pad through the external blowing pipe; a second electronic valve that is provided in the external blowing pipe between the external blowing pipe and the second blowing pad to adjust the amount of air supplied to the second blowing pad through the external blowing pipe; and an electronic control unit that controls a degree of opening or closing of each of the first and second electronic valves.

3. The blowing system of claim 1, further comprising: a first thermoelectric element that is provided in the external blowing pipe between the external blowing pipe and the first blowing pad to adjust a temperature of air supplied to the first blowing pad through the external blowing pipe; a second thermoelectric element that is provided in the external blowing pipe between the external blowing pipe and the second blowing pad to adjust a temperature of air supplied to the second blowing pad through the external blowing pipe; and an electronic control unit that controls a current supplied to the first and second thermoelectric elements.

4. The blowing system of claim 1, further comprising: a first electronic valve that is provided in the external blowing pipe between the external blowing pipe and the first blowing pad to adjust the amount of air supplied to the first blowing pad through the external blowing pipe; a second electronic valve that is provided in the external blowing pipe between the external blowing pipe and the second blowing pad to adjust the amount of air supplied to the second blowing pad through the external blowing pipe; a first thermoelectric element that is provided in the external blowing pipe between the external blowing pipe and the first blowing pad to adjust a temperature of air supplied to the first blowing pad through the external blowing pipe; a second thermoelectric element that is provided in the external blowing pipe between the external blowing pipe and the second blowing pad to adjust a temperature of air supplied to the second blowing pad through the external blowing pipe; and an electronic control unit that controls a degree of opening/closing of each of the first and second electronic valves and controls a current supplied to the first and second thermoelectric elements.

5. The blowing system of claim 1, further comprising: an exchangeable blowing pipe that is detachably coupled with the external blowing pipe, wherein the air processing unit is provided in the exchangeable blowing pipe.

6. The blowing system of claim 5, wherein a portion of the exchangeable blowing pipe is inserted into the external blowing pipe, and wherein when the exchangeable blowing pipe is inserted into the external blowing pipe, an air flow path of the external blowing pipe is connected to an air flow path of the exchangeable blowing pipe.

7. The blowing system of claim 1, further comprising: a motor; and an exchangeable blowing pipe that is connected to the external blowing pipe, wherein the exchangeable blowing pipe rotates in operable association with the motor, and wherein the air processing unit is provided in the exchangeable blowing pipe.

* * * * *